United States Patent Office.

JEARUM ATKINS, OF WASHINGTON, DISTRICT OF COLUMBIA.

*Letters Patent No. 75,511, dated March 17, 1868.*

IMPROVEMENT IN SMOKE-STACKS FOR LOCOMOTIVE-ENGINES.

*The Schedule referred to in these Letters Patent and making part of the same.*

TO ALL WHOM IT MAY CONCERN:

Be it known that I, JEARUM ATKINS, of Washington, District of Columbia, have invented a new and useful Improvement in Steam-Engine Boilers and Smoke-Stacks; and I hereby declare the following to be a full and exact description thereof, reference being had to the drawings that accompany and form a part of these specifications.

The nature of my invention consists in providing a series of conical or tapering tubes or passages, through which the products of combustion are made to pass on their way from the furnaces of steam-generators, for the purpose of increasing the draught from the furnace, as hereinafter described.

Figure 1 is a longitudinal vertical section of a portion of a steam-engine boiler and its smoke-stack, embracing my improvements.

Figure 2, a horizontal or bird's-eye view of the top of the smoke-stack taken on line A on fig. 1.

Figure 3, a horizontal section on line B on fig. 1.

Figure 4, a horizontal section on line C on fig. 1.

Figure 5, a horizontal section on line D on fig 1.

Figure 6, a horizontal section on line E on fig. 1.

Figure 7 is another horizontal or bird's-eye view of the top of the smoke-stack, representing another modification of the internal construction thereof.

Figure 8 is a vertical cross-section of a steam-boiler with its smoke-stack, showing my improvement in part, or a contemplated modification thereof.

Figure 9 is a cross-section taken on line $a$ on fig. 2; and

Figure 10 is a cross-section taken on line $b$ on fig. 2.

The lower portion of the smoke-stack is in the form of an inverted section of a cone, and extends down through the upper portion of the smoke-box, as shown in the drawings. This lower conical portion of the smoke-stack contains the short conical upright tubes F, which are held in position by the two horizontal circular disks G H, the upper one, G, being shown in the horizontal section, fig. 5. These disks G H are perforated with numerous holes to receive the tubes, as many tubes being inserted as can be contained within the circle of the disks, there being only sufficient metal left between the tube-holes in the upper disk to hold it together. The exhaust-steam pipe I passes through the centres of the disks G H, by which it is held in position. The upper portion of the smoke-stack is also in the form of an inverted section of a cone, and contains seven conical tubes J J J, (which number may be increased or diminished,) which are held in position by the circular horizontal disks K L. The upper end of the exhaust-pipe I is enlarged conically, and terminates in as many separate tubes M as there are tubes J, the axis of the latter being coincident with the former, thus causing the exhaust-steam to act upon the products of combustion with equal force in each of the several tubes J.

The principle upon which these conical tubes act in increasing the draught in furnaces is as follows:

The smoke and gases in their passage through the tubes in the direction of their increasing diameter, must, in order to fill the tubes, have their velocity retarded in a ratio corresponding to the increasing area of the tubes, and thus its momentum has to be overcome by the resistance of the atmospheric pressure at the large end of the tubes. The force with which the gases in the tubes act against the resisting atmosphere, tends to produce a vacuum in the smaller portion of the tube, and into this partial vacuum the gases from the fire rush with increased force; any diminution in the pressure in the tubes being equivalent to a corresponding increase of pressure in the fire-box. The tubes J, instead of being round, as described above, may be in the form of a hexagon in their cross-section, as represented at fig. 7, by which means greater strength would be imparted to the smoke-stack, and the disks K and L might be dispensed with; this form approaching so near a circle as not to be objectionable.

Figures 8, 9, and 10 represent a farther contemplated mode of carrying out my improvements.

In place of the numerous tubes F and disks G H, I would place in the space between the exhaust-pipe I and the outer casing of the smoke-stack, the several large conical tubes N, said tubes increasing in size and growing more conical from the exhaust-pipe outwards; the spaces between them being all of the same size and taper. The spaces between these tubes N increase in area from bottom to top, very much in the same ratio as the small conical tubes F, and their effect in increasing the draught, it is believed, would be essentially the same.

The tubes N, as also the exhaust-pipe I, are represented as being held in position by means of the transverse stay-rods O P, which are riveted at their outer ends to the smoke-stack, and at their inner ends to the exhaust-pipe I. Short angular pieces of metal may be riveted to these stay-rods and to the tubes N, for holding the latter in position.

The upper portion Q, (fig. 8,) of the smoke-stack is a single conical tube, of a size suitable for burning coke, with the exhaust-pipe I opening into its base in the usual manner.

Still another contemplated improvement is represented in the elongation and conical enlargement of the tubes E E E, fig. 1. The tubes E extend through the tube-plate into the smoke-box, their inner ends being enlarged conically, the lower tier of tubes being longest, and extending nearly to the front of the smoke-box. Each successive tier of tubes from the bottom is shorter than those next below, in order to give more room for the free exit of the products of combustion in their passage to the chimney. Instead of making the tubes entirely of one piece of metal from end to end, they may be made to extend only from one tube-plate to the other, as in the ordinary construction of boilers. Short conical tubes, which may be made of thin metal, and attached in any convenient manner to the main tubes, may in such a case be used to give the form to the tubes which may be requisite to produce the desired effect.

Having thus described my invention, I desire to state that I do not limit myself to the use of conical or tapering tubes or passages, in any definite form or number, for increasing the draught in furnaces, as the form and manner of arranging the same may be almost infinitely varied, and still produce the same or a similar effect; for instance, flat plates of metal might be placed either in the smoke-box or smoke-stack, to form a series of tapering passages for the products of combustion to pass through, either before or after they have been acted upon by the steam from the exhaust-pipe; the effect of which would doubtless be essentially the same, as causing the smoke and gases to pass through circular passages. Again, either of the modes proposed may be used separately, or combined with the others, or they may be used either with or without being combined with the steam-blast.

What I claim, and desire to secure by Letters Patent, is—

1. Providing a series of conical or tapering tubes or passages, through which the products of combustion are made to pass on their way from the furnaces of steam-generators, arranged substantially as shown and described.

2. I also claim the combination of the divided exhaust-nozzle and the tapering tubes or passages, substantially as shown and described.

3. I also claim the arrangement of blast-tubes M, with reference to the tubes or passages J J J and F F, substantially as shown and described.

In testimony whereof, I have signed my name to this specification in the presence of two subscribing witnesses:

JEARUM ATKINS.

Witnesses:
  A. K. WALKER,
  EDW'D P. FARIS.